United States Patent [19]

Denzinger et al.

[11] Patent Number: 5,026,494
[45] Date of Patent: Jun. 25, 1991

[54] AMINO GROUP-CONTAINING GRAFT POLYMER, AND ITS USE AS A DISPERSING VISCOSITY INDEX IMPROVER

[75] Inventors: Walter Denzinger, Speyer; Helmut Mach, Heidelberg; Juergen Mohr, Gruenstadt; Knut Oppenlaender, Ludwigshafen; Roland Schwen, Friedelsheim; Hans-Henning Vogel, Frankenthal, all of Fed. Rep. of Germany

[73] Assignee: BASF, Parsippany, N.J.

[21] Appl. No.: 504,485

[22] Filed: May 8, 1990

[30] Foreign Application Priority Data

Apr. 5, 1989 [DE] Fed. Rep. of Germany ....... 3910943

[51] Int. Cl.$^5$ ........................................... C10M 149/04
[52] U.S. Cl. .................................. 252/50; 525/333.6; 525/379; 525/293
[58] Field of Search ............... 252/50; 525/293, 333.6, 525/379

[56] References Cited

U.S. PATENT DOCUMENTS 4,715,975 12/1987 Kapuscinski et al. ................ 252/50
4,816,172 3/1989 Kapuscinski et al. ................ 252/50

Primary Examiner—Jacqueline V. Howard
Attorney, Agent, or Firm—William Conger; Michael Chipaloski

[57] ABSTRACT

An amino group containing graft polymer comprising a main chain polymer having allyl amine grafted onto it whereby the main chain polymer is a hydrogenated olefin/diene copolymer and the total nitrogen content of the graft copolymer is from 0.001 to 0.05 weight percent.

4 Claims, No Drawings

AMINO GROUP-CONTAINING GRAFT POLYMER, AND ITS USE AS A DISPERSING VISCOSITY INDEX IMPROVER

The invention deals with a graft polymer comprising a hydrogenated olefin/diene main chain polymer having an allyl amine grafted onto it.

Certain polymers and copolymers having average molecular weights between 10,000 and 200,000 are used as viscosity improvers in lubricating oils (compare, Ullmanns Encyklopapäder technischen Chemie, 4 Ed., Vol. 20, pg. 543 ff, Weinheim 1981).

Today, ordinary lubricating formulations additionally contain different types of additives as well as dispersing agents which function to maintain the oilinsoluble combustion residues in suspension, which can be up to 10 weight percent in diesel motors (carbon black, coke, etc., as well as resin and asphalt like oxidation products which favor aglomeration into solid particles) and thereby prevent depositions on metal surfaces, oil thickening and sludge precipitation in the motor as well as preventing corrosive wear via the neutralization of acidic combustion products (compare for example N.J.H. Small in Catalysts, Surfactants and Mineral Oil Additives, edited by J. Falbe and U. Hasserodt, G. Thieme Publishers, Stuttgart, 1978).

The most common examples of such dispersing agents are the many different reaction products of alkenyl-, for example, polyisobutylene and succinic acid anhydrides generally with amines, polyamines and similar reagents which are frequently described in the literature (compare for example Chem. Technol. Rev., No. 207, pg. 3 ff, NDC, New Jersey, 1982).

Since these dispersing agents necessarily are polar compounds or at least contain a sufficient number of polar groups in the molecule the polar properties of these dispersing agents interfere with properties of the generally nonpolar viscosity index improvers whereby for example a simultaneous negative influence in solubility or swellability can occur in a lubricating oil.

The compatability of a additive targeted for a formulation must therefore be very specific and it is not predictable in every instance.

It was therefore desirable to combine the properties of dispersing agents and viscosity index improvers in one polymer, in order on the one hand to get around the problem of additive compatability and on the other hand optionally to reduce the required total amount of polymer added to a formulation.

Suggested were several groups of viscosity index improvers having a dispersing effect (compare for example Chem. Technol. Rev., No. 207, p 225 ff, NDC, New Jersey, 1982). Examples are acyl group containing polymers and copolymers having different compositions which were reacted with amino group containing reagents (U.S. Pat. Nos. 4,735,736 and 4,670,173) or with amine modified polymers based on different polymers and copolymers (U.S. Pat. No. 4,715,975 and EP 171,167).

These and other examples together often requires a relatively high level of grafting of basic polymers with the subsequently introduced polar groups. Since these polar groups are generally amino groups this means that there is a relatively high nitrogen content.

For example, the ratio of an amine containing unit (allyl amine) per unit of main chain polymer (that is based on ethylene and/or propylene) is 1:100 to 300, more preferably 200.

The lowest amount of nitrogen described is accordingly 1 nitrogen in the allyl amine per 300 molecules of ethylene and/or 300 molecules of propylene, that is $14:300 \times 28 = 0.0016 = 0.16\%$ and/or for propylene 0.11%.

It has now been surprisingly shown that by selected grafting with allylamine units to an olefin/butadiene main chain polymer, products can be obtained having the same, or based on the nitrogen content, better dispersing effects, for example, by selecting a lower temperature than required for the optimum decomposition of the initiator selected in spite of excess allyl amine based on the quantity to be polymerized in situ.

The object was therefore to prepare graft polymers which would have fewer amino groups, that is overall a lower nitrogen content, and which would display the same or better effects than prior viscosity index improvers and dispersing agents.

This object was met by amino group containing graft polymers comprising a main chain polymer having allyl amine grafted on to it in which the main chain polymer is a hydrogenated olefin/diene copolymer and the total nitrogen content of the graft polymer is from 0.001 to 0.05 weight percent.

Most preferred are graft polymers of the aforesaid type in which the main chain polymer is a hydrogenated styrene/butadiene-random copolymer having a styrene/butadiene ratio of from 60:40 to 50:50; having a molecular weight (weight average) of 5000 to 500,000 and having a degree of hydrogenation of from 95 to 99.5%.

Starting materials for the main chain polymer are conventional hydrogenated olefin/diene-copolymers which are known as viscosity index improvers having particularly high shear stabilities.

Olefin comonomers are generally vinyl aromatics such as styrene, α-methylstyrene, ring methylated and/or alklylated styrenes. Preferably, however, unsubstituted styrene is utilized Examples of conjugated diene comonomers are chloroprene, 2,3-dimethyl-1,3-butadiene, isoprene and 1,3-butadiene whereby both of the latter are preferred. Mixtures too are possible.

The copolymers can be structured statistically as well as in blocks, in a linear fashion or branched, stoichiometrically or in an excess with one of the components, whereby the amount of vinyl aromatic is between 20 and 80 percent, preferably between 40 and 60 percent. Their preparation is by radical or anionic copolymerization or block polymerization following conventional methods, for example according to W.R. Sorenson and T.W. Campbell, Päreparative Methoden der Polymerenchemie, Chemie Publishers, Weinheim 1962, pgs. 204ff.

The average molecular weight (weight average) of such copolymers is between 10,000 and 200,000, more preferably between 80,000 and 120,000.

The olefinic double bonds remaining in the diene portion following polymerization and/or copolymerization are always hydrogenated subsequently employing suitable heterogenous or homogenously dissolved catalysts and generally under increased hydrogen pressure.

The preparation of the starting copolymers is disclosed in DE 20 60 914 and DE 18 11 516 which are hereby incorporated by reference for this purpose The remaining residual portion of unsaturated units is between 0.2 and 4 percent based on the diene portion, however preferably not more than about 0.5 percent, or expressed differently, the degree of hydrogenation (i.e. in percent the maximum possible saturation of the remaining olefinic double bonds) is 96 to 99.5 percent.

An example of a hydrogenated statistical styrene/butadiene copolymer is a product having a styrene to butadiene mass ratio of 57:43; a molecular weight (weight average) of 110,000 and having a degree of hydrogenation of 99.5 percent.

By reacting main chain polymers with allyl amine in the presence of free radical initiators we succeeded in preparing graft polymers having different nitrogen contents.

The graft reaction can be carried out in a conventional fashion, whereby for example the main chain polymer can exist in a hydrocarbon solvent such as hexane or cyclohexane together with the allyl amine and at an elevated temperature generally at the reflux temperature of the solvent, a free radical initiator is added all at once or continuously whereby generally a reaction temperature is selected which remains below the free radical formation temperature optimum for the initiator selected.

Although the nature of the graft polymer obtained cannot be described precisely it is assumed that one molecule of allyl amine reacts with the α-carbon atom of the styrene units. However, the number of nonreacted units in the main chain polymer is extremely small since the free radical concentration is kept very low by selecting the reacting conditions so that in spite of excess allyl amine there is only a small reaction into the desired graft polymers having a very low nitrogen content.

It is also possible to place the dissolved polymer in a boiling solvent and then add a mixture of allyl amine and initiator. Other variations are also conceivable and in theory known. Examples of initiators ar for example azoisobutyronitrile, peroxides, hydroperoxides and related compounds which are known as initiators. It is also possible to conduct the graft reaction in an emulsion according to conventional methods.

In order to avoid simultaneous crosslinking of the chains of the main polymers the reaction can be done in the presence of a controller or reaction moderator such as mercaptoethanol, dodecyl mercaptan.

However, an excess of the grafting component allyl amine, based on the olefin polymer, i.e. the styrene content of the main chain polymer, is sufficient alone to act as a regulator in the sense of preventing crosslinking.

Finishing can occur as follows: removing by distillation the solvent or excess allyl amine or before removing the volatile components; adding a suitable oil as a final solvent, or by first treating the reaction solution with a suitable washing solution (a saturated ammonium chloride solution, sodium hydrogen sulfate solution, subsequently water) and liberating volatile components following drying with conventional drying agents. If the grafting is done in an emulsion, finishing is normally done following conventional methods, for example, denaturation or coagulation.

Hydrocarbons commonly used for lubricating oils are examples of mineral lubricants which can be derived from naturally occurring paraffin or naphthene containing petroleum oils by distillation and subsequent raffination.

In addition to the additives used according to the present invention the mineral lubricating oil compositions can also contain other conventional additives, for example antioxidants, agents to lower the pour point, colorants, detergents, etc.

The graft polymer is generally dissolved in the mineral oil in quantities of from 0.5 to 6, more preferably 1 to 5 weight percent at from 80 to 130° C.

EXAMPLES a) 200 parts of a hydrogenated styrene/butadiene-copolymer having a styrene to butadiene mass ratio of from 57 to 43 and having an average molecular weight of from 100,000 to 110,000 was dissolved in 1000 parts of cyclohexane. 40 parts of allyl amine was added and heating occurred to refluxing in a nitrogen atmosphere. Then 10 parts of dicumyl peroxide was slowly added to the boiling mixture which was heated until the addition ended an additional 2 hours while refluxing. Following cooling, washing was done successively with 200 parts of a saturated ammonium chloride solution and water and the organic phase was dried with sodium sulfate.

After removing the solvent and volatile components as well as optionally excess allyl amine the polymer was obtained as a residue having a total nitrogen content of 0.006 weight percent.

b) To evaluate the dispersing effect of additives a "Tüpfel" (drop analysis) test can be used as a screening test. The test is described, for example, in a somewhat modified form by A. Schilling in Les Huiles pour Moteurs et le Graissage des Moteurs, Vol. 1, pg. 89 f, 1962.

Here, a solution of the polymer obtained under a) in a plain basic oil is prepared in which subsequently carbon black (for example MT-carbon black, Thermax, Lehmann & Voss & Co., Hamburg) is dispersed at about 50° C. while stirring for one hour. This dispersion is developed on flow paper (filter paper) like a chromatogram for about 20 hours.

The areas of pure solvent (oil) and divided carbon black are compared.

The carbon black carrier capacity is obviously a function of the concentration of the additive and also the viscosity of the base oil:

| Oil | Polymer | Polymer Content % | Carbon Black Content % | Area Percent of Carbon Black (Spot) % |
| --- | --- | --- | --- | --- |
| NIA | — | — | 0.36 | 8 |
| NIA | main chain polymer according to example a) | 1.5 | 0.36 | 42 |
| NIA | graft polymer according to example a) | 1.5 | 0.36 | 68 |
| NIIA | — | — | 0.36 | 16 |
| NIIA | main chain polymer according to example a) | 1.5 | 0.36 | 58 |
| NIAA | graft polymer according to example a) | 1.5 | 0.36 | 63 |

I and/or we claim:

1. An amino group containing graft polymer, comprising a main chain polymer having allylamine grafted to it, said main chain polymer comprising a hydrogenated styrene/butadiene copolymer wherein the total nitrogen content of said graft polymer is from 0.001 to 0.05 weight percent.

2. The graft polymer of claim 1 wherein said main chain polymer is a hydrogenated styrene/butadiene copolymer having a styrene/butadiene ratio of from 60:40 to 50:50; a molecular weight of from 5,000 to 500,000; and a degree of hydrogenation of from 95 to 99.5 percent.

3. A lubricating oil composition, comprising a hydrocarbon base oil and lubricating oil additives wherein said composition contains effective amount of the graft polymer of claim 1 as a dispersing viscosity index improver.

4. The lubricating oil composition of claim 3 wherein the amount of said graft polymer of claim 1 is from 0.5 to 6.0 weight percent, based on said lubricating oil composition.

* * * * *